US008219402B2

(12) United States Patent
Bodin et al.

(10) Patent No.: US 8,219,402 B2
(45) Date of Patent: Jul. 10, 2012

(54) ASYNCHRONOUS RECEIPT OF INFORMATION FROM A USER

(75) Inventors: William K. Bodin, Austin, TX (US); David Jaramillo, Lake Worth, FL (US); Jesse W. Redman, Cedar Park, TX (US); Derral C. Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 914 days.

(21) Appl. No.: 11/619,236

(22) Filed: Jan. 3, 2007

(65) Prior Publication Data

US 2008/0162130 A1    Jul. 3, 2008

(51) Int. Cl.
G10L 11/00 (2006.01)
G10L 21/00 (2006.01)
H04M 1/64 (2006.01)
G06F 15/16 (2006.01)
G06F 3/16 (2006.01)

(52) U.S. Cl. ............... 704/270.1; 704/270; 379/67.1; 709/204; 715/727

(58) Field of Classification Search .............. 704/270, 704/235
See application file for complete search history.

(56) References Cited

U.S. PATENT DOCUMENTS

| 5,732,216 | A | * | 3/1998 | Logan et al. ............... 709/203 |
| 5,819,220 | A | | 10/1998 | Sarukkai |
| 5,892,825 | A | | 4/1999 | Mages et al. |
| 5,901,287 | A | | 5/1999 | Bull et al. |
| 5,903,727 | A | | 5/1999 | Nielsen |
| 5,911,776 | A | | 6/1999 | Guck |
| 6,029,135 | A | | 2/2000 | Krasle |
| 6,032,260 | A | | 2/2000 | Sasmazel |
| 6,141,693 | A | | 10/2000 | Perlman |
| 6,178,511 | B1 | | 1/2001 | Cohen |
| 6,240,391 | B1 | | 5/2001 | Ball et al. |
| 6,266,649 | B1 | | 7/2001 | Linden |
| 6,282,512 | B1 | | 8/2001 | Hemphill |
| 6,302,695 | B1 | * | 10/2001 | Rtischev et al. ............... 434/157 |
| 6,311,194 | B1 | | 10/2001 | Sheth |
| 6,463,440 | B1 | | 10/2002 | Hind |
| 6,519,617 | B1 | | 2/2003 | Wanderski |
| 6,532,477 | B1 | | 3/2003 | Tang |

(Continued)

FOREIGN PATENT DOCUMENTS

EP    1197884    1/2006

(Continued)

OTHER PUBLICATIONS

Aaron Zinman and Judith Donath, "Navigating persistent audio", in CHI '06 extended abstracts on Human factors in computing systems (CHI EA '06), 2006.*

(Continued)

Primary Examiner — Brian Albertalli
(74) Attorney, Agent, or Firm — Brevetto Law Group

(57) ABSTRACT

Methods, systems, and computer program products are provided for asynchronous receipt of information from a user. Embodiments include receiving in a library management system a media file containing a speech response recorded on a hand held device in response to the playing of a media file containing one or more audio prompts for information; converting the speech response stored in the media file to text; and storing the text in association with an identification of the user.

27 Claims, 8 Drawing Sheets

U.S. PATENT DOCUMENTS

| | | |
|---|---|---|
| 6,604,076 B1 | 8/2003 | Holley |
| 6,731,993 B1 | 5/2004 | Carter |
| 6,771,743 B1 | 8/2004 | Butler |
| 6,802,041 B1 | 10/2004 | Rehm |
| 6,839,669 B1 | 1/2005 | Gould |
| 6,912,691 B1 | 6/2005 | Dodrill et al. |
| 6,944,591 B1 | 9/2005 | Raghunandan |
| 6,965,569 B1 | 11/2005 | Carolan et al. |
| 6,976,082 B1 | 12/2005 | Ostermann et al. |
| 6,993,476 B1 | 1/2006 | Dutta |
| 7,017,120 B2 | 3/2006 | Shnier |
| 7,031,477 B1 | 4/2006 | Mella |
| 7,039,643 B2 | 5/2006 | Sena et al. |
| 7,046,772 B1 | 5/2006 | Moore et al. |
| 7,062,437 B2 | 6/2006 | Kovales et al. |
| 7,120,702 B2 | 10/2006 | Huang et al. |
| 7,130,850 B2 | 10/2006 | Russell-Falla et al. |
| 7,139,713 B2 * | 11/2006 | Falcon et al. ............... 704/270 |
| 7,171,411 B1 | 1/2007 | Lewis |
| 7,313,528 B1 | 12/2007 | Miller |
| 7,356,470 B2 | 4/2008 | Roth et al. |
| 7,366,712 B2 | 4/2008 | He et al. |
| 7,437,408 B2 | 10/2008 | Schwartz |
| 7,454,346 B1 | 11/2008 | Dodrill |
| 7,505,978 B2 | 3/2009 | Bodin |
| 7,561,932 B1 | 7/2009 | Holmes |
| 7,568,213 B2 | 7/2009 | Carhart |
| 7,657,006 B2 | 2/2010 | Woodring |
| 7,685,525 B2 | 3/2010 | Kumar |
| 7,890,517 B2 | 2/2011 | Angelo |
| 7,949,681 B2 | 5/2011 | Bodin |
| 7,996,754 B2 | 8/2011 | Bodin |
| 2001/0027396 A1 | 10/2001 | Sato |
| 2001/0040900 A1 | 11/2001 | Salmi |
| 2001/0049725 A1 | 12/2001 | Kosuge |
| 2001/0054074 A1 | 12/2001 | Hayashi |
| 2002/0013708 A1 | 1/2002 | Walker et al. |
| 2002/0032564 A1 | 3/2002 | Ehsani |
| 2002/0032776 A1 | 3/2002 | Hasegawa et al. |
| 2002/0039426 A1 | 4/2002 | Takemoto |
| 2002/0054090 A1 | 5/2002 | Silva |
| 2002/0062216 A1 | 5/2002 | Guenther |
| 2002/0062393 A1 | 5/2002 | Borger |
| 2002/0083013 A1 | 6/2002 | Rollins et al. |
| 2002/0095292 A1 | 7/2002 | Mittal et al. |
| 2002/0151998 A1 | 10/2002 | Kemppi |
| 2002/0152210 A1 | 10/2002 | Johnson et al. |
| 2002/0160751 A1 * | 10/2002 | Sun et al. .................... 455/412 |
| 2002/0178007 A1 | 11/2002 | Slotznick |
| 2002/0194286 A1 | 12/2002 | Matsuura et al. |
| 2002/0194480 A1 | 12/2002 | Nagao |
| 2002/0198720 A1 | 12/2002 | Takagi |
| 2003/0028380 A1 * | 2/2003 | Freeland et al. ............. 704/260 |
| 2003/0033331 A1 | 2/2003 | Sena et al. |
| 2003/0055868 A1 | 3/2003 | Fletcher |
| 2003/0103606 A1 | 6/2003 | Rhie |
| 2003/0110272 A1 | 6/2003 | du Castel et al. |
| 2003/0110297 A1 | 6/2003 | Tabatabai et al. |
| 2003/0115056 A1 | 6/2003 | Gusler |
| 2003/0115064 A1 | 6/2003 | Gusler |
| 2003/0126293 A1 | 7/2003 | Bushey |
| 2003/0132953 A1 | 7/2003 | Johnson |
| 2003/0158737 A1 | 8/2003 | Csicsatka |
| 2003/0160770 A1 | 8/2003 | Zimmerman |
| 2003/0163211 A1 | 8/2003 | Van Der Meulen |
| 2003/0167234 A1 | 9/2003 | Bodmer |
| 2003/0172066 A1 | 9/2003 | Cooper |
| 2003/0188255 A1 | 10/2003 | Shimizu |
| 2003/0212654 A1 | 11/2003 | Harper |
| 2003/0225599 A1 | 12/2003 | Mueller |
| 2003/0229847 A1 | 12/2003 | Kim |
| 2004/0003394 A1 | 1/2004 | Ramaswamy |
| 2004/0034653 A1 | 2/2004 | Maynor et al. |
| 2004/0041835 A1 | 3/2004 | Lu |
| 2004/0068552 A1 | 4/2004 | Kotz et al. |
| 2004/0088349 A1 | 5/2004 | Beck |
| 2004/0107125 A1 | 6/2004 | Guheen |
| 2004/0199375 A1 | 10/2004 | Ehsani et al. |
| 2004/0201609 A1 | 10/2004 | Obrador |
| 2004/0254851 A1 | 12/2004 | Himeno et al. |
| 2005/0004992 A1 | 1/2005 | Horstmann |
| 2005/0015254 A1 | 1/2005 | Beaman |
| 2005/0045373 A1 * | 3/2005 | Born .............................. 174/254 |
| 2005/0065625 A1 | 3/2005 | Sass |
| 2005/0071780 A1 | 3/2005 | Muller et al. |
| 2005/0076365 A1 | 4/2005 | Popov et al. |
| 2005/0108521 A1 | 5/2005 | Silhavy |
| 2005/0144002 A1 | 6/2005 | Ps |
| 2005/0154580 A1 | 7/2005 | Horowitz |
| 2005/0203959 A1 | 9/2005 | Muller et al. |
| 2005/0232242 A1 | 10/2005 | Karaoguz et al. |
| 2005/0251513 A1 | 11/2005 | Tenazas |
| 2005/0288926 A1 * | 12/2005 | Benco et al. .................... 704/235 |
| 2006/0008252 A1 | 1/2006 | Kim |
| 2006/0020662 A1 | 1/2006 | Robinson |
| 2006/0031447 A1 | 2/2006 | Holt |
| 2006/0048212 A1 | 3/2006 | Tsuruoka |
| 2006/0050794 A1 | 3/2006 | Tan |
| 2006/0052089 A1 | 3/2006 | Khurana et al. |
| 2006/0075224 A1 | 4/2006 | Tao |
| 2006/0095848 A1 | 5/2006 | Naik |
| 2006/0112844 A1 | 6/2006 | Hiller |
| 2006/0114987 A1 | 6/2006 | Roman |
| 2006/0123082 A1 | 6/2006 | Kopikis |
| 2006/0136449 A1 | 6/2006 | Parker et al. |
| 2006/0140360 A1 | 6/2006 | Crago et al. |
| 2006/0149781 A1 | 7/2006 | Blankinship |
| 2006/0155698 A1 | 7/2006 | Vayssiere |
| 2006/0159109 A1 | 7/2006 | Lamkin et al. |
| 2006/0168507 A1 | 7/2006 | Hansen |
| 2001/0047349 A1 | 8/2006 | Takemoto |
| 2006/0173985 A1 | 8/2006 | Moore |
| 2006/0184679 A1 * | 8/2006 | Izdepski et al. ............... 709/229 |
| 2006/0190616 A1 | 8/2006 | Mayerhofer et al. |
| 2006/0193450 A1 | 8/2006 | Flynt |
| 2006/0206533 A1 | 9/2006 | MacLaurin |
| 2006/0224739 A1 | 10/2006 | Anantha |
| 2006/0233327 A1 | 10/2006 | Roberts et al. |
| 2006/0253699 A1 | 11/2006 | Della-Libera |
| 2006/0282317 A1 | 12/2006 | Rosenberg |
| 2006/0287745 A1 | 12/2006 | Richenstein |
| 2006/0288011 A1 | 12/2006 | Gandhi |
| 2007/0027958 A1 | 2/2007 | Haslam |
| 2007/0028264 A1 * | 2/2007 | Lowe .............................. 725/35 |
| 2007/0043759 A1 | 2/2007 | Bodin et al. |
| 2007/0061229 A1 | 3/2007 | Ramer et al. |
| 2007/0061266 A1 | 3/2007 | Moore et al. |
| 2007/0073728 A1 | 3/2007 | Klein et al. |
| 2007/0077921 A1 | 4/2007 | Hayashi et al. |
| 2007/0078655 A1 | 4/2007 | Semkow et al. |
| 2007/0083540 A1 | 4/2007 | Gundla et al. |
| 2007/0091206 A1 | 4/2007 | Bloebaum |
| 2007/0100836 A1 | 5/2007 | Eichstaedt et al. |
| 2007/0101274 A1 | 5/2007 | Kurlander |
| 2007/0112844 A1 | 5/2007 | Tribble et al. |
| 2007/0118426 A1 | 5/2007 | Barnes, Jr. |
| 2007/0124458 A1 | 5/2007 | Kumar |
| 2007/0124802 A1 | 5/2007 | Anton et al. |
| 2007/0130589 A1 | 6/2007 | Davis et al. |
| 2007/0147274 A1 | 6/2007 | Vasa et al. |
| 2007/0155411 A1 * | 7/2007 | Morrison ........................ 455/466 |
| 2007/0174326 A1 | 7/2007 | Schwartz et al. |
| 2007/0191008 A1 | 8/2007 | Bucher et al. |
| 2007/0192327 A1 | 8/2007 | Bodin |
| 2007/0192674 A1 | 8/2007 | Bodin |
| 2007/0192683 A1 | 8/2007 | Bodin |
| 2007/0192684 A1 | 8/2007 | Bodin |
| 2007/0208687 A1 | 9/2007 | O'Conor |
| 2007/0213857 A1 | 9/2007 | Bodin |
| 2007/0213986 A1 | 9/2007 | Bodin |
| 2007/0214147 A1 | 9/2007 | Bodin |
| 2007/0214148 A1 | 9/2007 | Bodin |
| 2007/0214149 A1 | 9/2007 | Bodin |
| 2007/0214485 A1 | 9/2007 | Bodin |
| 2007/0220024 A1 | 9/2007 | Putterman et al. |
| 2007/0239837 A1 * | 10/2007 | Jablokov et al. ............... 709/206 |
| 2007/0253699 A1 | 11/2007 | Yen et al. |

| | | | |
|---|---|---|---|
| 2007/0276837 A1 | 11/2007 | Bodin | |
| 2007/0276865 A1 | 11/2007 | Bodin | |
| 2007/0276866 A1 | 11/2007 | Bodin | |
| 2007/0277088 A1 | 11/2007 | Bodin | |
| 2007/0277233 A1 | 11/2007 | Bodin | |
| 2008/0033725 A1* | 2/2008 | Peak et al. | 704/260 |
| 2008/0034278 A1 | 2/2008 | Tsou et al. | |
| 2008/0052415 A1 | 2/2008 | Kellerman et al. | |
| 2008/0082576 A1 | 4/2008 | Bodin | |
| 2008/0082635 A1* | 4/2008 | Bodin et al. | 709/220 |
| 2008/0161948 A1 | 7/2008 | Bodin | |
| 2008/0162131 A1 | 7/2008 | Bodin | |
| 2008/0162559 A1* | 7/2008 | Bodin et al. | 707/104.1 |
| 2008/0201376 A1* | 8/2008 | Khedouri et al. | 707/104.1 |
| 2008/0275893 A1 | 11/2008 | Bodin | |
| 2009/0271178 A1* | 10/2009 | Bodin et al. | 704/8 |

FOREIGN PATENT DOCUMENTS

| | | |
|---|---|---|
| WO | WO 0182139 | 11/2001 |
| WO | WO 2005/106846 | 11/2005 |

OTHER PUBLICATIONS

Nishimoto T., Yuki, H., Kawahara, T., Araki, T., and Niimi, Y., "Design and evaluation of the asynchronous voice meeting system AVM", Systems and computers in Japan, Wieley Periodicals, 33, 11, 61-69, 2002.*
Text to Speech MP3 with Natural Voices 1.71, Published Oct. 5, 2004.
Managing multimedia content and delivering services across multiple client platforms using XML, London Communications Symposium, xx, xx, Sep. 10, 2002, pp. 1-7.
PCT Search Report and Written Opinion International Application PCT/EP2007/050594.
Adapting Multimedia Internet Content for Universal Access, Rakesh Mohan, John R. Smith, Chung-Sheng Li, IEEE Transactions on Multimedia vol. 1, No. 1, p. 104-p. 144.
Office Action Dated May 24, 2006 in U.S. Appl. No. 11/420,018.
Office Action Dated Sep. 29, 2006 in U.S. Appl. No. 11/536,733.
Office Action Dated Jan. 3, 2007 in U.S. Appl. No. 11/619,253.
Office Action Dated May 24, 2006 in U.S. Appl. No. 11/420,016.
Office Action Dated May 24, 2006 in U.S. Appl. No. 11/420,015.
Office Action Dated Mar. 9, 2006 in U.S. Appl. No. 11/372,318.
Office Action Dated Mar. 9, 2006 in U.S. Appl. No. 11/372,329.
Office Action Dated Mar. 9, 2006 in U.S. Appl. No. 11/372,325.
Office Action Dated Mar. 9, 2006 in U.S. Appl. No. 11/372,323.
Office Action Dated Feb. 13, 2006 in U.S. Appl. No. 11/352,679.
Office Action Dated Feb. 13, 2006 in U.S. Appl. No. 11/352,824.
Office Action Dated Feb. 13, 2006 in U.S. Appl. No. 11/352,760.
Buchana et al., "Representing Aggregated Works in the Digital Library", ACM, 2007, pp. 247-256.
Office Action, U.S. Appl. No. 11/352,760, Sep. 16, 2010.
Office Action, U.S. Appl. No. 11/352,680, Jun. 10, 2010.
Final Office Action, U.S. Appl. No. 11/352,680, Sep. 7, 2010.
Office Action, U.S. Appl. No. 11/352,679, May 28, 2010.
Final Office Action, U.S. Appl. No. 11/352,679, Nov. 15, 2010.
Office Action, U.S. Appl. No. 11/372,317, Sep. 23, 2010.
Final Office Action, U.S. Appl. No. 11/372,329, Nov. 6, 2009.
Office Action, U.S. Appl. No. 11/372,319, Apr. 21, 2010.
Final Office Action, U.S. Appl. No. 11/372,319, Jul. 2, 2010.
Final Office Action, U.S. Appl. No. 11/420,014, Apr. 3, 2010.
Final Office Action, U.S. Appl. No. 11/420,017, Sep. 23, 2010.
Final Office Action, U.S. Appl. No. 11/619,216, Jun. 25, 2010.
Final Office Action, U.S. Appl. No. 11/619,236, Oct. 22, 2010.
Office Action, U.S. Appl. No. 12/178,448, Apr. 2, 2010.
Final Office Action, U.S. Appl. No. 12/178,448, Sep. 14, 2010.
Babara et al.; Bell Communications Research, Morristown, NJ; "The Audio Web"; pp. 97-104; 1997.
Hoschka, et al; "Synchronized Multimedia Integration Language (SMIL) 1.0 Specification"; pp. 1-43; found at website http://www.w3.org/TR/1998lPR-smil-19980409; Apr. 9, 1998.
Casalaina et al., "BMRC Procedures: RealMedia Guide"; pp. 1-7; Berkeley Multimedia Research Center, Berkeley, CA; found at http://web.archive.org/web/20030218131051/http://bmrc.berkeley.edu/info/procedures/rm.html; Feb. 13, 1998.
Babara et al.; "The Audio Web"; Proc. 6th Int. conf. on Information and Knowledge Management; Jan. 1997; XP002352519; Las Vegas; USA; pp. 97-104.
Hoschka, et al; "Synchronized Multimedia Intergration Langquage (SMIL) 1.0 Specification"; 89 Apr. 1998; doi: http://www.w3.org/TR/1998/PR-smil-19980409/#anchor.
Casalaina, et al.; "BMRC Procedures: RealMedia Guide"; doi: http://web.archive.org/web/20030218131051/http://bmrc.berkeley.edu/info/procedures/rm.html.
U.S. Appl. No. 11/352,710 Office Action mailed Jun. 11, 2009.
U.S. Appl. No. 11/352,727 Office Action mailed May 19, 2009.
U.S. Appl. No. 11/266,559 Final Office Action mailed Apr. 20, 2009.
U.S. Appl. No. 11/266,662 Final Office Action mailed Oct. 30, 2008.
U.S. Appl. No. 11/266,675 Final Office Action mailed Apr. 6, 2009.
U.S. Appl. No. 11/266,698 Final Office Action mailed Dec. 19, 2008.
U.S. Appl. No. 11/352,709 Office Action mailed May 14, 2009.
U.S. Appl. No. 11/207,911 Final Office Action mailed Apr. 29, 2008.
U.S. Appl. No. 11/207,911 Final Office Action mailed Apr. 15, 2009.
U.S. Appl. No. 11/226,747 Final Office Action mailed Sep. 25, 2008.
U.S. Appl. No. 11/266,744 Final Office Action mailed May 7, 2008.
U.S. Appl. No. 11/207,912 Final Office Action mailed May 7, 2008.
U.S. Appl. No. 11/207,912 Final Office Action mailed Apr. 28, 2009.
U.S. Appl. No. 11/266,663 Final Office Action mailed Sep. 16, 2008.
U.S. Appl. No. 11/331,694 Final Office Action mailed Mar. 30, 2009.
U.S. Appl. No. 11/331,692 Final Office Action mailed Feb. 9, 2009.
U.S. Appl. No. 11/207,914 Final Office Action mailed May 7, 2008.
U.S. Appl. No. 11/207,914 Final Office Action mailed Apr. 14, 2009.
U.S. Appl. No. 11/207,913 Final Office Action mailed Dec. 23, 2008.
U.S. Appl. No. 11/226,746 Final Office Action mailed Sep. 15, 2008.
U.S. Appl. No. 11/207,912 Office Action mailed Jan. 25, 2010.
U.S. Appl. No. 11/207,911 Notice of Allowance mailed Feb. 3, 2010.
U.S. Appl. No. 11/226,746 Final Office Action mailed Jul. 31, 2009.
U.S. Appl. No. 11/226,746 Office Action mailed Jan. 25, 2010.
U.S. Appl. No. 11/352,709 Final Office Action mailed Nov. 5, 2009.
U.S. Appl. No. 11/352,698 Office Action mailed Apr. 29, 2009.
U.S. Appl. No. 11/331,692 Office Action mailed Aug. 17, 2009.
U.S. Appl. No. 11/352,680 Office Action mailed Jun. 23, 2006.
U.S. Appl. No. 11/372,317 Office Action mailed Jul. 8, 2009.
U.S. Appl. No. 11/536,733 Final Office Action mailed Jul. 22, 2009.
U.S. Appl. No. 11/420,017 Office Action mailed Jul. 9, 2009.
U.S. Appl. No. 11/536,781 Office Action mailed Jul. 17, 2009.
U.S. Appl. No. 11/420,014 Office Action mailed Jul. 23, 2009.
U.S. Appl. No. 11/420,018 Final Office Action mailed Jul. 21, 2009.
U.S. Appl. No. 11/352,760 Office Action mailed Apr. 15, 2009.
U.S. Appl. No. 11/352,760 Final Office Action mailed Nov. 16, 2009.
U.S. Appl. No. 11/352,824 Notice of Allowance mailed Jun. 5, 2008.
U.S. Appl. No. 11/352,824 Office Action mailed Jan. 22, 2008.
U.S. Appl. No. 11/352,680 Final Office Action mailed Dec. 21, 2009.
U.S. Appl. No. 11/352,679 Office Action mailed Apr. 30, 2009.
U.S. Appl. No. 11/352,679 Final Office Action mailed Oct. 29, 2009.
U.S. Appl. No. 11/372,323 Office Action mailed Oct. 28, 2008.
U.S. Appl. No. 11/372,318 Office Action mailed Mar. 18, 2008.
U.S. Appl. No. 11/372,318 Final Office Action mailed Jul. 9, 2008.
U.S. Appl. No. 11/372,329 Final Office Action mailed Nov. 6, 2009.
U.S. Appl. No. 11/372,325 Office Action mailed Feb. 25, 2009.
U.S. Appl. No. 11/372,329 Office Action mailed Feb. 27, 2009.
U.S. Appl. No. 11/536,781 FOA mailed Jan. 15, 2010.
U.S. Appl. No. 11/420,015 Office Action mailed Mar. 20, 2008.
U.S. Appl. No. 11/420,015 FOA mailed Sep. 3, 2008.
U.S. Appl. No. 11/420,015 Office Action mailed Dec. 2, 2008.
U.S. Appl. No. 11/420,016 Office Action mailed Mar. 3, 2008.
U.S. Appl. No. 11/420,016 FOA mailed Aug. 29, 2008.
U.S. Appl. No. 11/420,017 FOA mailed Dec. 31, 2009.
U.S. Appl. No. 11/420,018 Office Action mailed Mar. 21, 2008.
U.S. Appl. No. 11/420,018 FOA mailed Aug. 29, 2008.
U.S. Appl. No. 11/420,018 Office Action mailed Dec. 3, 2008.
U.S. Appl. No. 11/536,733 Office Action mailed Dec. 30, 2008.
U.S. Appl. No. 11/619,216 Office Action mailed Jan. 26, 2010.
U.S. Appl. No. 11/619,253 Office Action mailed Apr. 2, 2009.

* cited by examiner

ASYNCHRONOUS RECEIPT OF INFORMATION FROM A USER

BACKGROUND OF THE INVENTION

1. Field of the Invention

The field of the invention is data processing, or, more specifically, methods, systems, and products for asynchronous receipt of information from a user.

2. Description of Related Art

Managers are increasingly isolated from one another and their employees. One reason for this isolation is that managers are often time constrained and their communication occurs with many different devices and often communications requires two or more managers or employees to be available at the same time. Furthermore, often employers elicit information from their employees. Such information is desired but the timing of the receipt of the information is flexible. There therefore is a need for improvement in communications among users such as managers and employees that reduces the devices used to communicate and reduces the requirement for more than one user to communicate at the same time. There is also an ongoing need for improvement in the receipt of information from employees and other users.

SUMMARY OF THE INVENTION

Methods, systems, and computer program products are provided for asynchronous receipt of information from a user. Embodiments include receiving in a library management system a media file containing a speech response recorded on a hand held device in response to the playing of a media file containing one or more audio prompts for information; converting the speech response stored in the media file to text; and storing the text in association with an identification of the user.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
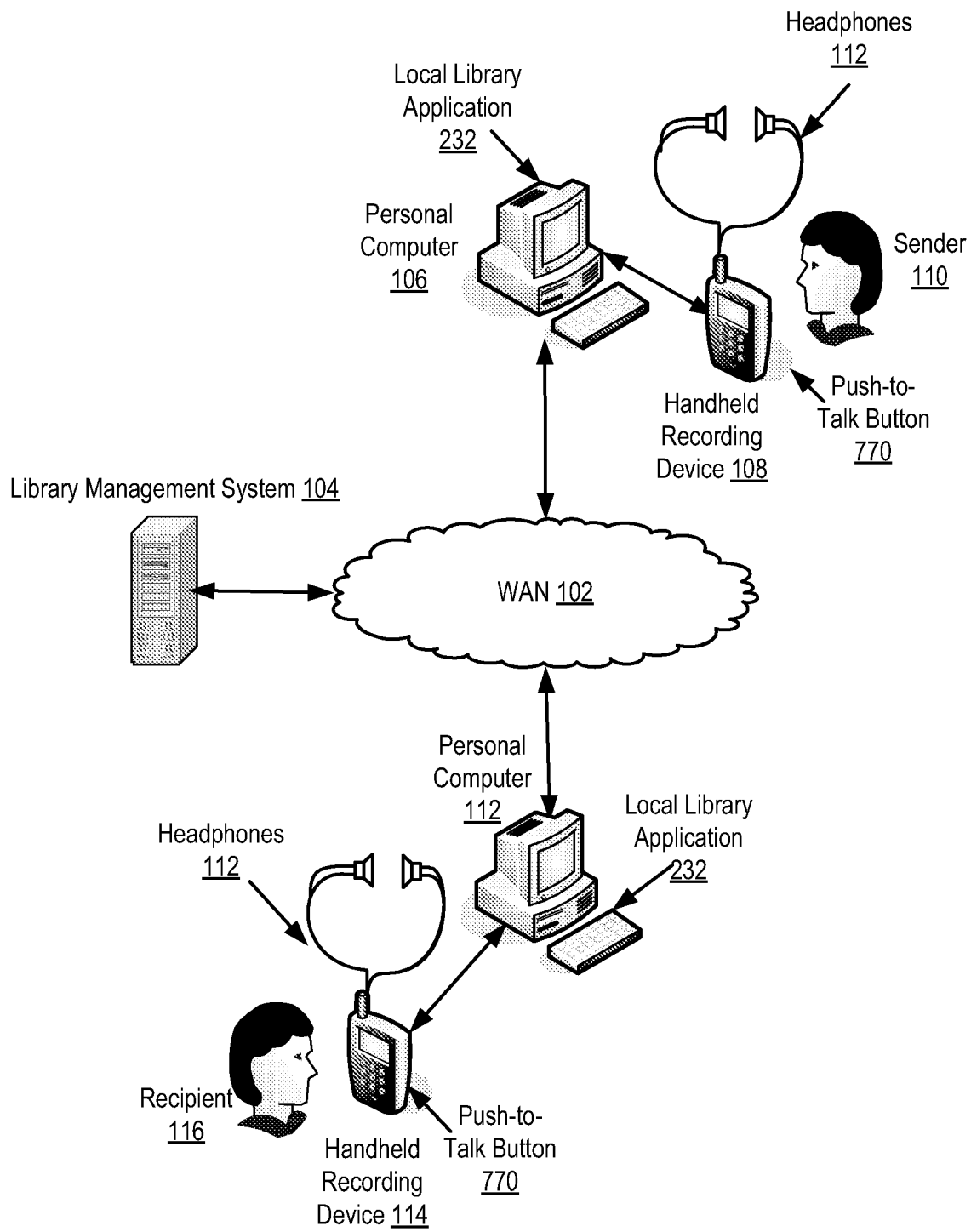
FIG. 1 sets forth a network diagram of a system for asynchronous communications using messages recorded on handheld devices according to embodiments of the present invention.

Exemplary methods, systems, and products for asynchronous communications and asynchronous receipt of information in accordance with the present invention are described with reference to the accompanying drawings, beginning with FIG. 1. FIG. 1 sets forth a network diagram of a system for asynchronous communications using messages recorded on handheld recording devices according to embodiments of the present invention. Asynchronous communications means communications among parties that occurs with some time delay. Asynchronous communications according to the present invention advantageously allows participants of communications to send, receive, and respond to communications at their own convenience with no requirement to be available simultaneously.

The exemplary system of FIG. 1 is also capable of asynchronous receipt of information from a user according to the present invention. Asynchronous receipt of information from a user according to embodiments of the present invention advantageously allows a user to provide information as responses to audio prompts at the user's convenience thereby providing increased flexibility in the receipt of information.

The system of FIG. 1 includes two personal computers (106 and 112) coupled for data communications to a wide area network ('WAN') (102). Each of the personal computers (106 and 112) of FIG. 1 has installed upon it a local library application (232). A local library application (232) includes computer program instructions capable of transferring media files containing recorded messages to a handheld recording device (108 and 114). The local library application (232) also includes computer program instructions capable of receiving media files containing messages from the handheld recording device (108 and 114) and transmitting the media files to a library management system (104).

The example of FIG. 1 also includes a library management system (104). The library management system of FIG. 1 is capable of asynchronous communications by receiving a recorded message having been recorded on a handheld device (108) converting the recorded message to text; identifying a recipient (116) of the message in dependence upon the text; associating the message with content under management by a library management system in dependence upon the text; and storing the message for transmission to another handheld device (114) for the recipient. The exemplary library management system (104) of FIG. 1 manages asynchronous communications using recorded messages according to the present invention, as well as additional content associated with those recorded messages. Such associated content under management include, for example, other recorded messages created by senders and recipients, emails, media files containing media content, spreadsheets, presentations, RSS ('Really Simple Syndication') feeds, web pages, and well as any other content that will occur to those of skill in the art. Maintaining the content as well as managing asynchronous communications relating to that content advantageously provides tight coupling between the communications between users and the content related to those communications. Such tight coupling provides the ability to determine that content under management is the subject of the communications and therefore provide an identification of such content to a recipient. Such tight coupling also provides the ability to attach that content to the message providing together the content which is the subject of the communications and the communications themselves.

The library management system of FIG. 1 is also capable of asynchronous receipt of information from a user according to the present invention by receiving in the library management system (104) a media file containing a speech response recorded on a hand held device (114 and 108) in response to the playing of a media file containing one or more audio prompts for information; converting the speech response stored in the media file to text; and storing the text in association with an identification of the user. In the example of FIG. 1, either the sender (110) or recipient (116) may be users for asynchronous receipt of information according to the present invention.

The exemplary system of FIG. 1 is capable of asynchronous communications according to the present invention by recording a message from a sender (110) on handheld device (108). The handheld recording device includes a microphone for receiving speech of the message and is capable of recording the message in a media file. One handheld recording device useful according to embodiments of the present invention is the WP-U2J available from Samsung.

The exemplary system of FIG. 1 is capable of transferring the media file containing the recorded message from the handheld recording device (108) to a local library application (232). Media files containing one or messages may be transferred to the local library application by periodically synchronizing the handheld recording device with the local library application allowing a sender to begin transmission of the message at the convenience of the sender.

The exemplary system of FIG. 1 is also capable of transferring the media file containing the recorded message to a library management system (104). The library management system comprises computer program instructions capable of receiving a recorded message; converting the recorded message to text; identifying a recipient of the message in dependence upon the text; associating the message with content under management by a library management system in dependence upon the text; and storing the message for transmission to another handheld device for the recipient The exemplary system of FIG. 1 is also capable of transferring the media file containing the recorded message to a local library application (232) installed on a personal computer (112). The system of FIG. 1 is also capable of transmitting message to the handheld recording device (114) of the recipient (116) who may listen to the message using headphones (112) or speakers on the device. A recipient may transfer messages to the handheld device by synchronizing the handheld recording device with the local library application (232) allowing the recipient to obtain messages at the recipients convenience. The recipient may now respond to the sender in the same manner providing two way asynchronous communications between sender and recipient.

The arrangement of devices making up the exemplary system illustrated in FIG. 1 is for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Asynchronous communications and asynchronous receipt of information from a user in accordance with the present invention is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising an exemplary library management system (104) useful in asynchronous communications according to embodiments of the present invention. The library management system (104) of FIG. 2 includes at least one computer processor (156) or 'CPU' as well as random access memory (168) ('RAM') which is connected through a system bus (160) to processor (156) and to other components of the library management system.

Stored in RAM (168) is a library management application (202) for asynchronous communications according to the present invention including computer program instructions for receiving a recorded message, the message recorded on a handheld device; converting the recorded message to text; identifying a recipient of the message in dependence upon the text; associating the message with content under management by a library management system in dependence upon the text; and storing the message for transmission to another handheld device for the recipient.

The library management application (202) also includes an information receipt engine (222) capable of asynchronous receipt of information from a user according to the present invention. The library management application (202) includes computer program instructions for receiving in the a library management system a media file containing a speech response recorded on a hand held device in response to the playing of a media file containing one or more audio prompts for information; converting by use of the speech recognition engine the speech response stored in the media file to text; and storing the text in association with an identification of the user.

Figure 2:
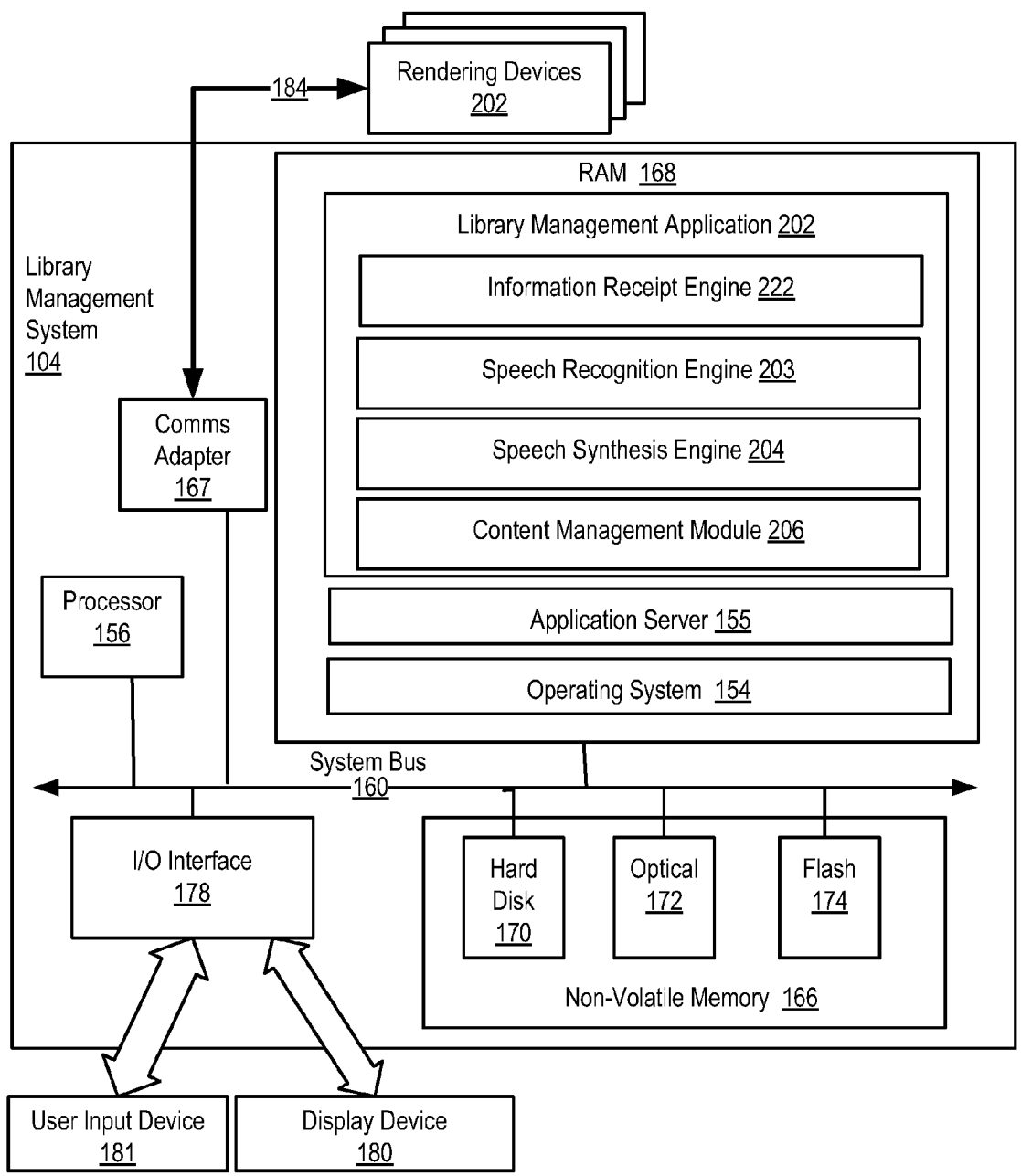
FIG. 2 sets forth a block diagram of automated computing machinery comprising an exemplary library management system useful in asynchronous communications according to embodiments of the present invention.

The library management application (202) of FIG. 2 also includes a speech recognition engine (203), computer program instructions for converting a recorded message to text. Examples of speech recognition engines capable of modification for use with library management applications according to the present invention include SpeechWorks available from Nuance Communications, Dragon NaturallySpeaking also available from Nuance Communications, ViaVoice available from IBM®, Speech Magic available from Philips Speech Recognition Systems, iListen from MacSpeech, Inc., and others as will occur to those of skill in the art.

The library management application (202) of FIG. 2 includes a speech synthesis engine (204), computer program instructions for creating speech identifying the content associated with the message. Examples of speech engines capable of creating speech identifying the content associated with the message, for example, IBM's ViaVoice Text-to-Speech, Acapela Multimedia TTS, AT&T Natural Voices™ Text-to-Speech Engine, and Python's pyTTS class.

The library management application (202) of FIG. 2 includes a content management module (206), computer program instructions for receiving a recorded message; identifying a recipient of the message in dependence upon text converted from the message; associating the message with content under management by a library management system in dependence upon the text; and storing the message for transmission to another handheld device for the recipient.

Also stored in RAM (168) is an application server (155), a software platform that provides services and infrastructure required to develop and deploy business logic necessary to provide web clients with access to enterprise information systems. Also stored in RAM (168) is an operating system (154). Operating systems useful in computers according to embodiments of the present invention include UNIX™, Linux™, Microsoft XP™, AIX™, IBM's i5/OS™, and others as will occur to those of skill in the art. Operating system (154) and library management module (202) in the example of FIG. 2 are shown in RAM (168), but many components of such software typically are stored in non-volatile memory (166) also.

Library management system (104) of FIG. 2 includes non-volatile computer memory (166) coupled through a system bus (160) to processor (156) and to other components of the library management system (104). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary library management system of FIG. 2 includes one or more input/output interface adapters (178). Input/output interface adapters in library management systems implement user-oriented input/output through, for example, software drivers and computer hardware for controlling output to display devices (180) such as computer display screens, as well as user input from user input devices (181) such as keyboards and mice.

The exemplary library management system (104) of FIG. 2 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for asynchronous communications according to embodiments of the present invention include modems for wired dial-up communications, Ethernet (IEEE 802.3) adapters for wired network communications, and 802.11b adapters for wireless network communications.

Asynchronous Communications

Figure 3:
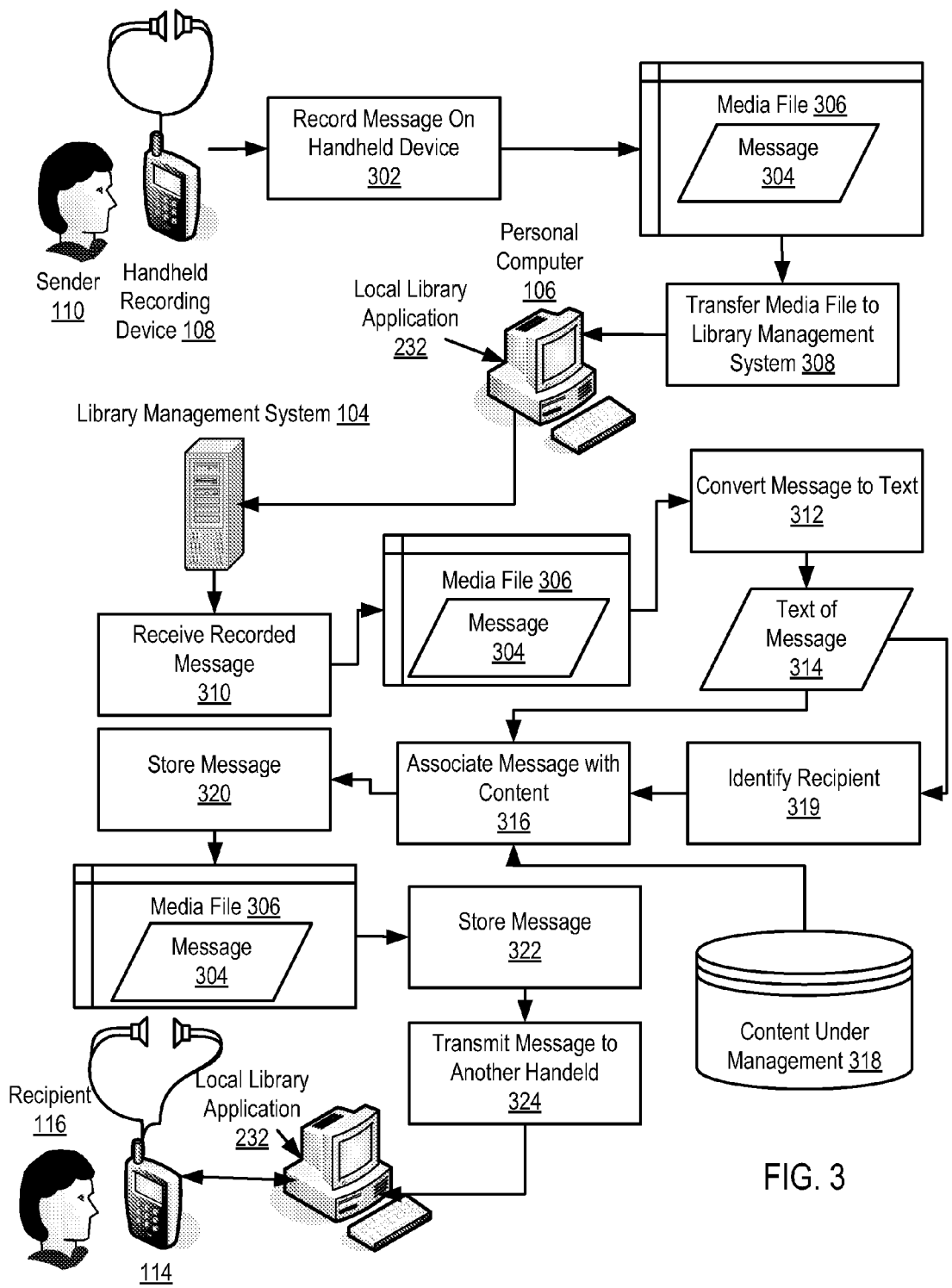
FIG. 3 sets forth a flow chart illustrating an exemplary method for asynchronous communications according to embodiments of the present invention.

For further explanation, FIG. 3 sets forth a flow chart illustrating an exemplary method for asynchronous communications according to embodiments of the present invention that includes recording (302) a message (304) on handheld device (108). Recording (302) a message (304) on handheld device (108) typically includes recording a speech message on a handheld recording device (108) in a media file (306) using a data format supported by the handheld recording device (108). Examples of media files useful in asynchronous communications according to the present invention include MPEG 3 ('.mp3') files, MPEG 4 ('.mp4') files, Advanced Audio Coding ('AAC') compressed files, Advances Streaming Format ('ASF') Files, WAV files, and many others as will occur to those of skill in the art.

The method of FIG. 3 includes transferring (308) a media file (306) containing the recorded message (304) to a library management system (104). As discussed above, one way of transferring (308) a media file (306) containing the recorded message (304) to a library management system (104) includes synchronizing the handheld recording device (108) with a local library application (232) which in turns uploads the media file to the local management system. Synchronizing the handheld recording device (108) with a local library application (232) advantageously allows a sender to record messages at the sender's convenience and also the sender to initiate the sending of those messages at the sender's convenience.

The method of FIG. 3 also includes receiving (310) the recorded message (304). In the example of FIG. 3, a library management system (104) receives the recorded message in a media file from a local library application (232). Local library applications (232) according to the present invention may be configured to upload messages from a sender to a library management system (104) and download messages for a recipient from a library management system (104) periodically, such as daily, hourly and so on, upon synchronization with handheld recording devices, or in any other manner as will occur to those of skill in the art.

The method of FIG. 3 also includes converting (312) the recorded message (304) to text (314). Converting (312) the recorded message (304) to text (314) may be carried out by a speech recognition engine. Speech recognition is the process of converting a speech signal to a set of words, by means of an algorithm implemented as a computer program. Different types of speech recognition engines currently exist. Isolated-word speech recognition systems, for example, require the speaker to pause briefly between words, whereas continuous speech recognition systems do not. Furthermore, some speech recognition systems require a user to provide samples of his or her own speech before using them, whereas other systems are said to be speaker-independent and do not require a user to provide samples.

To accommodate larger vocabularies, speech recognition engines use language models or artificial grammars to restrict the combination of words and increase accuracy. The simplest language model can be specified as a finite-state network, where the permissible words following each word are explicitly given. More general language models approximating natural language are specified in terms of a context-sensitive grammar.

Examples of commercial speech recognition engines currently available include SpeechWorks available from Nuance Communications, Dragon NaturallySpeaking also available from Nuance Communications, ViaVoice available from IBM®, Speech Magic available from Philips Speech Recognition Systems, iListen from MacSpeech, Inc., and others as will occur to those of skill in the art.

The method of FIG. 3 also includes identifying (319) a recipient (116) of the message (304) in dependence upon the text (314). Identifying (319) a recipient (116) of the message (304) in dependence upon the text (314) may be carried out by scanning the text for previously identified names or user identifications. Upon finding a match, identifying (319) a recipient (116) of the message (304) may be carried out by retrieving a user profile for the identified recipient including information facilitating sending the message to the recipient.

The method of FIG. 3 also includes associating (316) the message (304) with content (318) under management by a library management system in dependence upon the text (314). Associating (316) the message (304) with content (318) under management by a library management system in dependence upon the text (314) may be carried out by creating speech identifying the content associated with the message; and associating the speech with the recorded message for transmission with the recorded message as discussed below with reference to FIG. 4. Associating (316) the message (304) with content (318) under management by a library management system in dependence upon the text (314) may also be carried out by extracting keywords from the text; and searching content under management for the keywords as discussed below with reference to FIG. 5. Associating (316) the message (304) with content (318) under management by a library management system in dependence upon the text (314) may also be carried out by extracting an explicit identification of the associated content from the text; and searching content under management for the identified content as discussed below with reference with FIG. 6.

The method of FIG. 3 also includes storing (320) the message (304) for transmission to another handheld device (114) for the recipient (116). In the example of FIG. 3, a library management system (104) stores the message for downloading to local library application (232) for the recipient.

The method of FIG. 3 also includes transmitting (324) the message (304) to another handheld device (114). Transmitting (324) the message (304) to another handheld device (114) according to the method of FIG. 3 may be carried out by downloading the message to a local library application (232) for the recipient (116) and synchronizing the handheld recording device (114) with the local library application (232). Local library applications (232) according to the present invention may be configured to download messages for a recipient from a library management system (104) periodically, such as daily, hourly and so on, upon synchronization with handheld recording devices, or in any other manner as will occur to those of skill in the art.

To aid users in communication, content identified as associated with communications among users may be identified, described in speech, and presented to those users thereby seamlessly supplementing the existing communications among the users. For further explanation, FIG. 4 sets forth a flow chart illustrating an exemplary method for associating (316) the message (304) with content (318) under management by a library management system in dependence upon the text (314). The method of FIG. 4 includes creating (408) speech (412) identifying the content (318) associated with the message (304). Creating (408) speech (412) identifying the content (318) associated with the message (304) may be carried out by processing the text using a text-to-speech engine in order to produce a speech presentation of the text and then recording the speech produced by the text-speech-engine in the audio portion of a media file. Examples of speech engines capable of converting text to speech for recording in the audio portion of a media file include, for example, IBM's ViaVoice Text-to-Speech, Acapela Multimedia TTS, AT&T Natural Voices™ Text-to-Speech Engine, and Python's pyTTS class. Each of these text-to-speech engines is composed of a front end that takes input in the form of text and outputs a symbolic linguistic representation to a back end that outputs the received symbolic linguistic representation as a speech waveform.

Typically, speech synthesis engines operate by using one or more of the following categories of speech synthesis: articulatory synthesis, formant synthesis, and concatenative synthesis. Articulatory synthesis uses computational biomechanical models of speech production, such as models for the glottis and the moving vocal tract. Typically, an articulatory synthesizer is controlled by simulated representations of muscle actions of the human articulators, such as the tongue, the lips, and the glottis. Computational biomechanical models of speech production solve time-dependent, 3-dimensional differential equations to compute the synthetic speech output. Typically, articulatory synthesis has very high computational requirements, and has lower results in terms of natural-sounding fluent speech than the other two methods discussed below.

Formant synthesis uses a set of rules for controlling a highly simplified source-filter model that assumes that the glottal source is completely independent from a filter which represents the vocal tract. The filter that represents the vocal tract is determined by control parameters such as formant frequencies and bandwidths. Each formant is associated with a particular resonance, or peak in the filter characteristic, of the vocal tract. The glottal source generates either stylized glottal pulses for periodic sounds and generates noise for aspiration. Formant synthesis often generates highly intelligible, but not completely natural sounding speech. However, formant synthesis typically has a low memory footprint and only moderate computational requirements.

Concatenative synthesis uses actual snippets of recorded speech that are cut from recordings and stored in an inventory or voice database, either as waveforms or as encoded speech. These snippets make up the elementary speech segments such as, for example, phones and diphones. Phones are composed of a vowel or a consonant, whereas diphones are composed of phone-to-phone transitions that encompass the second half of one phone plus the first half of the next phone. Some concatenative synthesizers use so-called demi-syllables, in effect applying the diphone method to the time scale of syllables. Concatenative synthesis then strings together, or concatenates, elementary speech segments selected from the voice database, and, after optional decoding, outputs the resulting speech signal. Because concatenative systems use snippets of recorded speech, they often have the highest potential for sounding like natural speech, but concatenative systems typically require large amounts of database storage for the voice database.

Figure 4:
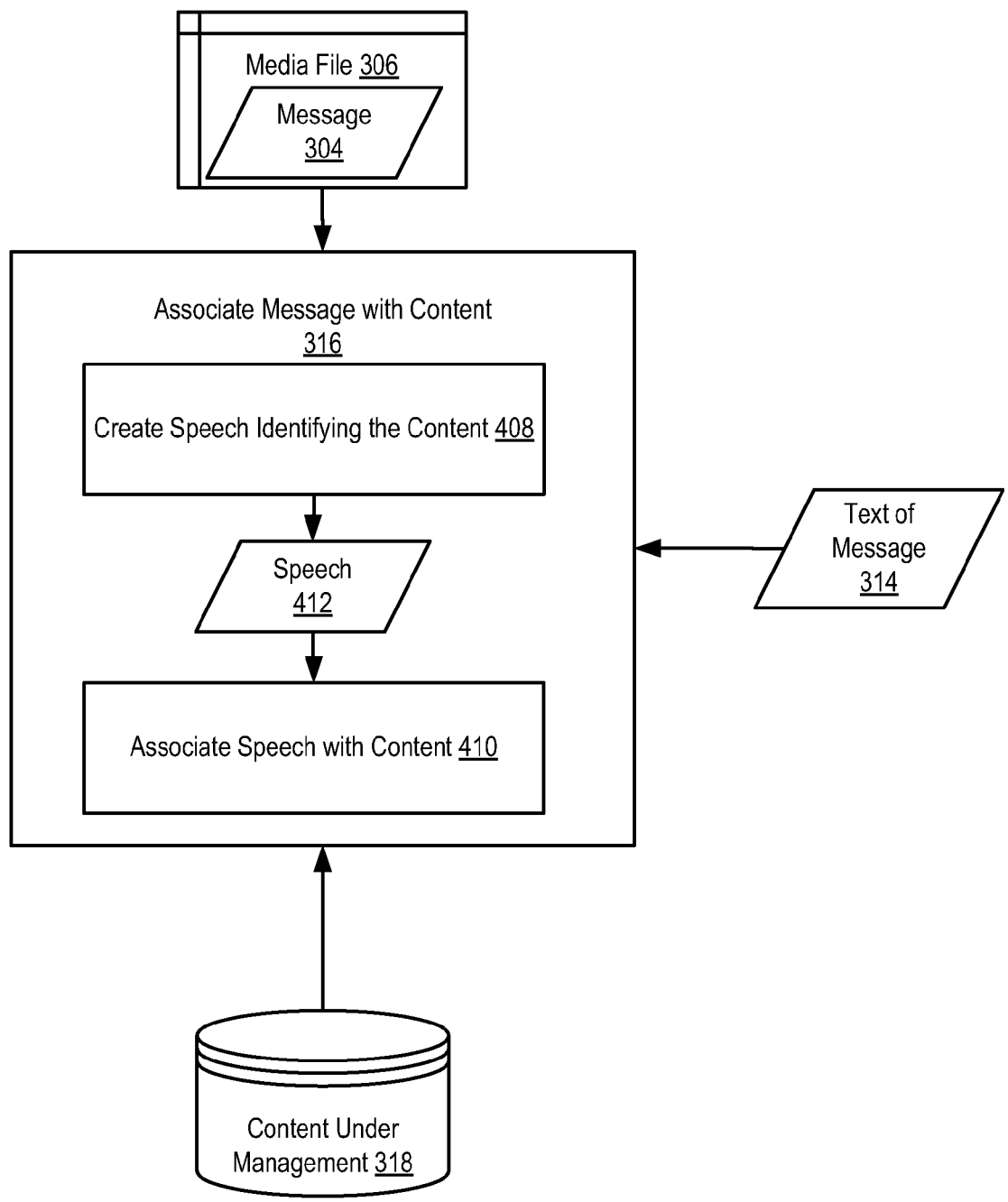
FIG. 4 sets forth a flow chart illustrating an exemplary method for associating the message with content under management by a library management system in dependence upon the text converted from a recorded message.

The method of FIG. 4 also includes associating (410) the speech (412) with the recorded message (304) for transmission with the recorded message (304). Associating (410) the speech (412) with the recorded message (304) for transmission with the recorded message (304) may be carried out by including the speech in the same media file as the recoded message, creating a new media file containing both the recorded message and the created speech, or any other method of associating the speech with the recorded message as will occur to those of skill in the art.

As discussed above, associated messages with content under management often requires identifying the content. For further explanation, FIG. 5 sets forth a flow chart illustrating another method for associating (316) the message (304) with content (318) under management by a library management system in dependence upon the text (314). The method of FIG. 5 includes extracting (402) keywords (403) from the text (314). Extracting (402) keywords (403) from the text (314) may be carried out by extracting words from the text that elicit information about content associated with the subject matter of the message such as, for example, 'politics,' 'work,' 'movies,' and so. Extracting (402) keywords (403) from the text (314) also may be carried out by extracting words from the text identifying types of content such as, for example, 'email,' 'file,' 'presentation,' and so on. Extracting (402) keywords (403) from the text (314) also may be carried out by extracting words from the text having temporal semantics, such as 'yesterday,' 'Monday,' '10:00 am.' and so on. The examples of extracting words indicative of subject matter, content type, or temporal semantics are presented for explanation and not for limitation. In fact, associating (316) the message (304) with content (318) under management by a library management system in dependence upon the text (314) may be carried out in many was as will occur to those of skill in the art and all such ways are within the scope of the present invention.

Figure 5:
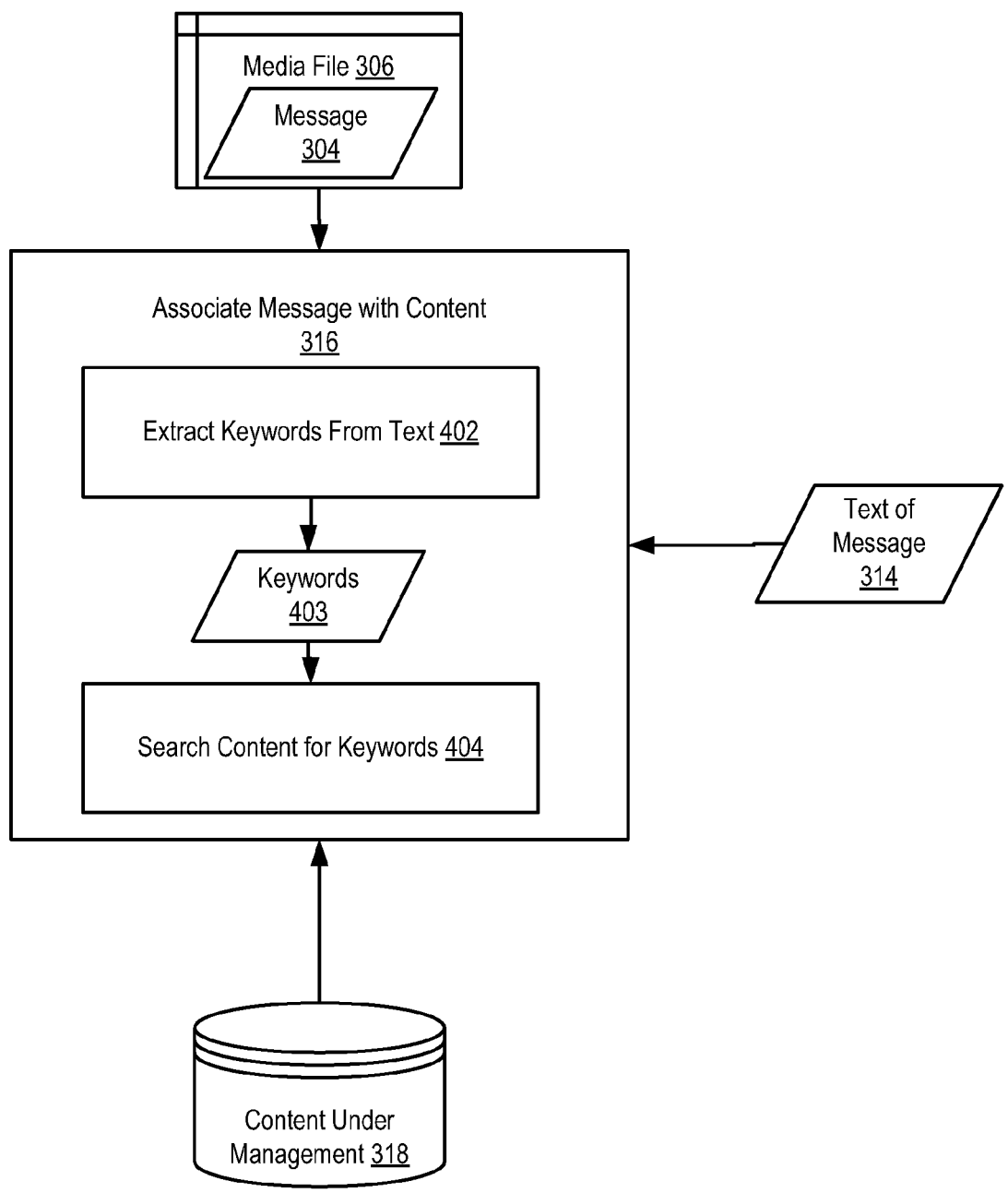
FIG. 5 sets forth a flow chart illustrating another method for associating the message with content under management by a library management system in dependence upon the text converted from a recorded message.
Figure 6:
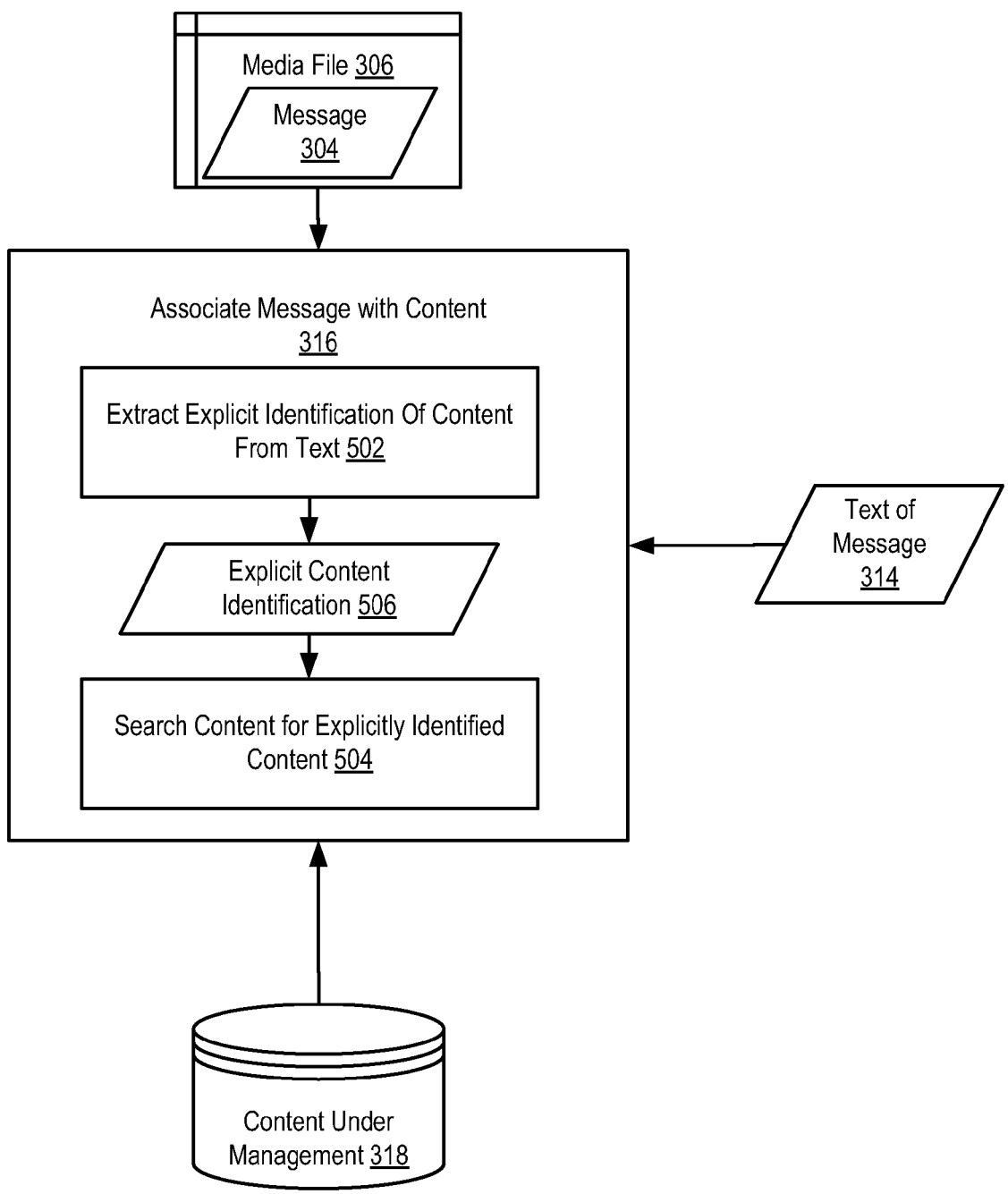
FIG. 6 sets forth a flow chart illustrating another method for associating the message with content under management by a library management system in dependence upon the text converted from a recorded message.

The method of FIG. 5 also includes searching (404) content (318) under management for the keywords (403). Searching (404) content (318) under management for the keywords (403) may be carried out by searching the titles, metadata, and content itself for the keywords and identifying as a match content having the most matching keywords or content having the best matching keywords according to predefined algorithms for selecting matching content from potential matches.

In some cases, the messages comprising communications among users may contain an explicit identification of content under management. For further explanation, FIG. 6 sets forth a flow chart illustrating another method for associating (316) the message (304) with content (318) under management by a library management system in dependence upon the text (314) includes extracting (502) an explicit identification (506) of the associated content from the text and searching content (318) under management for the identified content (506). Extracting (502) an explicit identification (506) of the associated content from the text may be carried out by identifying one or more words in the text matching a title or closely matching a title or metadata identification of specific content under management. For example, the phrase 'the Jones Presentation,' may be extracted as an explicit identification of a PowerPoint™ Presentation entitled 'Jones Presentation 5-2-2006.' For example, the phrase 'Your message of Yesterday,' may be extracted as an explicit identification of a message from the intended recipient of the message send a day earlier than the current message from which the text was converted according to the present invention.

Asynchronous Receipt of Information from a User

Figure 7:
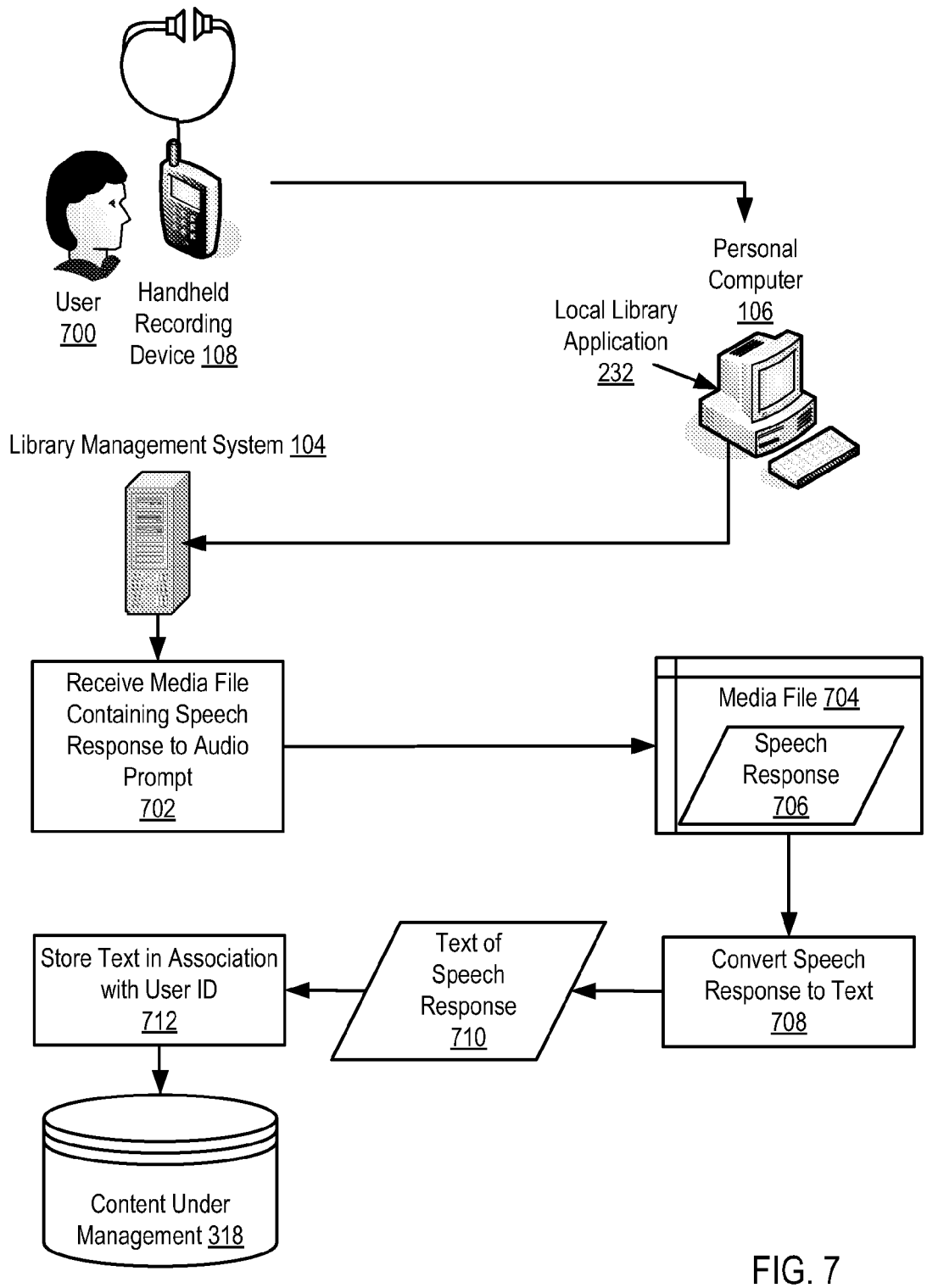
FIG. 7 sets forth a flow chart illustrating an exemplary method for asynchronous receipt of information from a user.

For further explanation, FIG. 7 sets forth a flow chart illustrating an exemplary method for asynchronous receipt of information from a user. The method of FIG. 7 includes receiving (702) in a library management system (104) a media file (704) containing a speech response (706) recorded on a hand held device in response to the playing of a media file containing one or more audio prompts for information. Examples of media files useful in asynchronous receipt of information from a user according to the present invention include MPEG 3 ('.mp3') files, MPEG 4 ('.mp4') files, Advanced Audio Coding ('AAC') compressed files, Advances Streaming Format ('ASF') Files, WAV files, and many others as will occur to those of skill in the art.

The method of FIG. 7 also includes converting (708) the speech response (706) stored in the media file (708) to text (710). Converting (708) the speech response (706) stored in the media file (708) to text (710) may be carried out by a speech recognition engine as discussed above with reference to FIG. 3.

The method of FIG. 7 also includes storing (712) the text (710) in association with an identification of the user. Storing (712) the text (710) in association with an identification of the user may be carried out by storing the text in association with a user account containing information received from a user in accordance with the present invention.

Asynchronous receipt of information from a user according to the method of FIG. 7 advantageously provides a vehicle for receipt of information from a user that provides increased flexibility to the user in providing the information. Media files useful in prompting the user for the information may contain prompts for information that together create an effective audio form that may be standardized to elicit information desired for many uses such as employment, management, purchasing and so on as will occur to those of skill in the art.

As mentioned above, asynchronous receipt of information from a user includes receiving an media file containing a speech response. For further explanation, therefore, FIG. 8 sets forth a flow chart illustrating an exemplary method for receiving (702) in a library management system (104) a media file (704) containing a speech response (706) recorded on a hand held device in response to the playing of a media file containing one or more audio prompts for information. The method of FIG. 8 includes transmitting (750) to the handheld device (108) a media file (752) containing one or more audio prompts (758) for information. Transmitting (750) to the handheld device (108) a media file (758) containing one or more audio prompts (758) for information may be carried out by synchronizing the handheld device (108) with a local library application (232) coupled for data communications with the library management system (104). Synchronizing the handheld device (108) with a local library application (232) coupled for data communications with the library management system (104) allows a user to install the media file containing the one or more audio prompts at the user's convenience.

Figure 8:
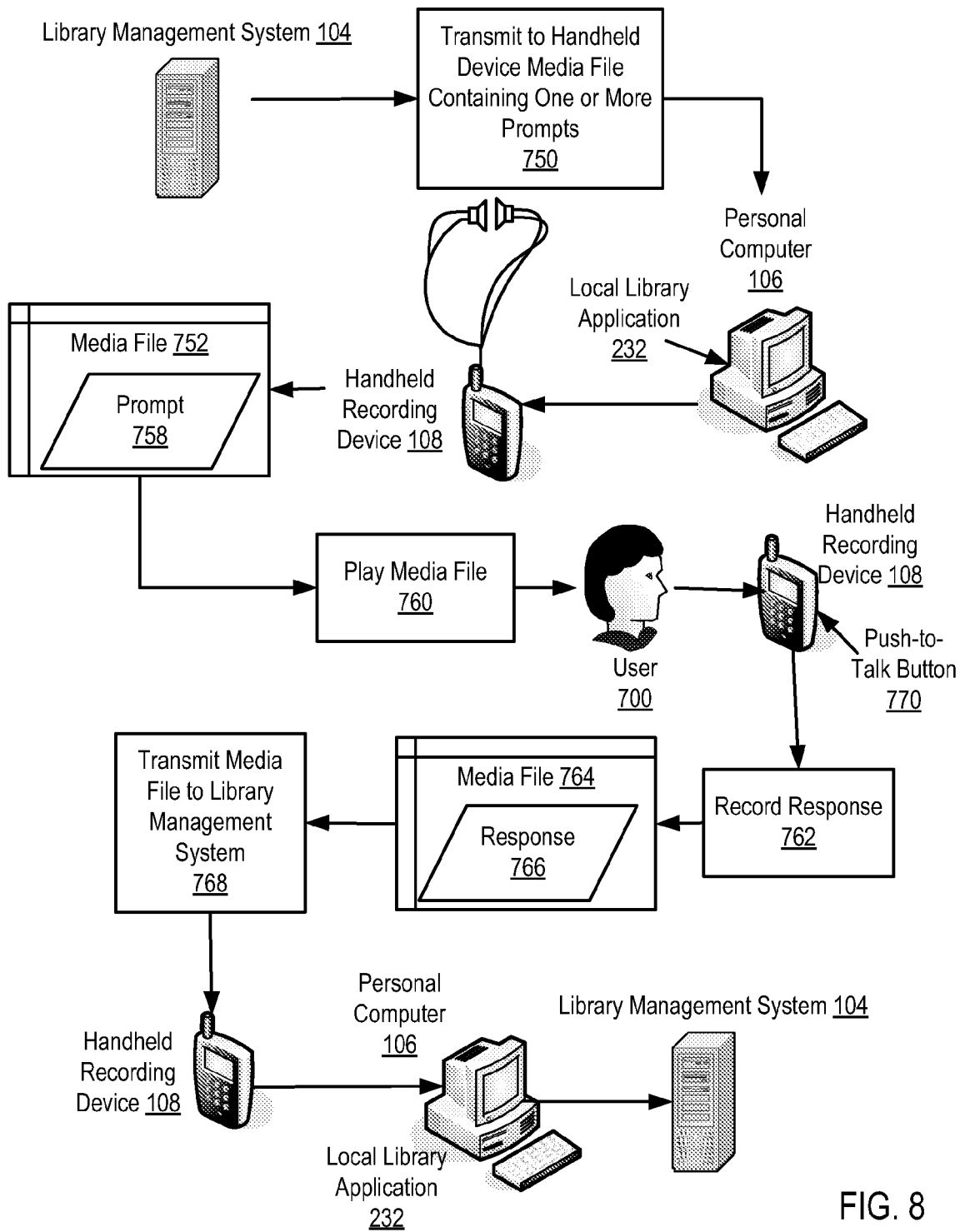
FIG. 8 sets forth a flow chart illustrating an exemplary method for receiving in a library management system a media file containing a speech response recorded on a hand held device in response to the playing of a media file containing one or more audio prompts for information.

The method of FIG. 8 also includes playing (760) on the handheld device (108) the media file (752) containing the one or more audio prompts (758) for information. As discussed above, a media file may contain a plurality of audio prompts that in effect create and audio form. Playing (760) on the handheld device (108) the media file (752) containing the one or more audio prompts (758) for information thereby informs the user of the information solicited by the audio form.

The method of FIG. 8 also includes recording (762) in another media file (764) on the handheld device (108) a speech response (766) from the user (700). Recording (762) in another media file (764) on the handheld device (108) a speech response from the user (700) may be carried out by pausing the playback of the media file (752) containing the one or more audio prompts (758) on the handheld device (108) the media file containing the one or more audio prompts (758) for information in response to a user's instruction to initiate recording in another media file (764) on the handheld device (108) the speech response. In the example of FIG. 8, the user's instruction to initiate recording in another media file on the handheld device the speech response is implemented as a user's invocation of a push-to-talk button (770).

Upon receipt of the speech response, the method of FIG. 8 may include continuing playback of the media file and the next audio prompt. The user may therefore continue to play audio prompts and record speech responses until the user has provided the information designed to be elicited by the audio prompts contained in the media file.

The method of FIG. 8 also includes transmitting (768) the media file (764) containing the speech (766) response to a library management system (104). Transmitting (768) the media file (764) containing the speech response (766) to a library management system (104) may be carried out by synchronizing the handheld device (108) with a local library application (232) coupled for data communications with the library management system (104). Synchronizing the handheld device (108) with a local library application (232)

coupled for data communications with the library management system (104) allows a user to initiate upload of the media file containing the one or more audio prompts to the library management system at the user's convenience.

Exemplary embodiments of the present invention are described largely in the context of a fully functional computer system for asynchronous communications using messages recorded on handheld devices and asynchronous receipt of information from a user. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for asynchronous receipt of information from a sender, the method comprising:
   receiving in a library management system on an intermediary device a media file containing a speech response recorded on a sender's hand held device in response to the playing of a media prompt file containing one or more audio prompts for information, the library management system comprising the intermediary device between a sender's hand held device and a recipient's hand held device, wherein the intermediary device, the sender's hand held device, and the recipient's hand held device are all distinct devices;
   converting, by the library management system, the speech response stored in the media file to text; and
   storing, by the library management system, the text in association with an identification of the sender.

2. The method of claim 1 wherein receiving in the library management system the media file containing the speech response recorded on the sender's hand held device in response to the playing of the media prompt file containing one or more audio prompts for information further comprises:
   transmitting to the sender's hand held device the media prompt file containing one or more audio prompts for information;
   playing on the sender's hand held device the media prompt file containing the one or more audio prompts for information;
   recording in another media file on the sender's hand held device a speech response from the sender; and
   transmitting the media file containing the speech response to the library management system.

3. The method of claim 2 wherein transmitting to the sender's hand held device the media prompt file containing one or more audio prompts for information further comprises synchronizing the sender's hand held device with a local library application coupled for data communications with the library management system.

4. The method of claim 2 wherein transmitting the media file containing the speech response to a library management system further comprises synchronizing the sender's hand held device with a local library application coupled for data communications with the library management system.

5. The method of claim 2 wherein recording in another media file on the sender's hand held device a speech response from the sender further comprises:
   pausing the playback of the media prompt file containing the one or more audio prompts on the sender's hand held device the media prompt file containing the one or more audio prompts for information in response to a sender's instruction to initiate recording in another media file on the sender's hand held device the speech response.

6. The method of claim 5 wherein the sender's instruction to initiate recording in another media file on the sender's hand held device the speech response further comprises a sender's invocation of a push-to-talk button.

7. The method of claim 1, further comprising:
   obtaining, by the library management system, content to be associated with the text;
   associating said content with the text; and
   extracting an explicit identification of the content from the text.

8. The method of claim 1, further comprising:
   transmitting, from the library management system to the sender's hand held device, the media prompt file containing one or more audio prompts for information, wherein the one or more audio prompts were previously uploaded to the library management system for storage.

9. The method of claim 1, further comprising:
   pausing the media prompt file one or more times;
   recording in another media file on the sender's hand held device a speech response from the sender while the media prompt file is paused said one or more times;
   transmitting the media file containing the speech response to the library management system; and
   providing the text to from the intermediary device of the library management system to the recipient's hand held device.

10. A system for asynchronous receipt of information from a sender, the system comprising a computer processor, a computer memory operatively coupled to the computer processor, the computer memory having disposed within it computer program instructions capable of:
    receiving in a library management system on an intermediary device a media file containing a speech response recorded on a sender's hand held device in response to the playing of a media prompt file containing one or more audio prompts for information, the library management system comprising the intermediary device between a sender's hand held device and a recipient's hand held device, wherein the intermediary device, the sender's hand held device, and the recipient's hand held device are all distinct devices;

converting, by the library management system, the speech response stored in the media file to text; and storing, by the library management system, the text in association with an identification of the sender.

11. The system of claim 10 wherein computer program instructions capable of receiving in the library management system the media file containing the speech response recorded on the sender's hand held device in response to the playing of the media prompt file containing one or more audio prompts for information further comprise computer program instructions capable of:

transmitting to the sender's hand held device the media prompt file containing one or more audio prompts for information;

playing on the sender's hand held device the media prompt file containing the one or more audio prompts for information;

recording in another media file on the sender's hand held device a speech response from the sender; and transmitting the media file containing the speech response to a library management system.

12. The system of claim 11 wherein computer program instructions capable of transmitting to the sender's hand held device the media prompt file containing one or more audio prompts for information further comprise computer program instructions capable of synchronizing the sender's hand held device with a local library application coupled for data communications with the library management system.

13. The system of claim 11 wherein computer program instructions capable of transmitting the media file containing the speech response to a library management system further comprise computer program instructions capable of synchronizing the sender's hand held device with a local library application coupled for data communications with the library management system.

14. The system of claim 11 wherein computer program instructions capable of recording in another media file on the sender's hand held device a speech response from the sender further comprise computer program instructions capable of:

pausing the playback of the media prompt file containing the one or more audio prompts on the sender's hand held device the media prompt file containing the one or more audio prompts for information in response to a sender's instruction to initiate recording in another media file on the sender's hand held device the speech response.

15. The system of claim 14 wherein the sender's instruction to initiate recording in another media file on the sender's hand held device the speech response further comprises a sender's invocation of a push-to-talk button.

16. The system of claim 10, wherein the computer program instructions are further capable of:

obtaining, by the library management system, content to be associated with the text;

associating said content with the text; and extracting an explicit identification of the content from the text.

17. The system of claim 10, wherein the computer program instructions are further capable of:

transmitting, from the library management system to the sender's hand held device, the media prompt file containing one or more audio prompts for information, wherein the one or more audio prompts were previously uploaded to the library management system for storage.

18. The system of claim 10, wherein the computer program instructions are further capable of:

pausing the media prompt file one or more times;

recording in another media file on the sender's hand held device a speech response from the sender while the media prompt file is paused said one or more times;

transmitting the media file containing the speech response to the library management system; and providing the text to from the intermediary device of the library management system to the recipient's hand held device.

19. A computer program product for asynchronous receipt of information from a sender, the computer program product embodied on a computer-readable recordable medium, the computer program product comprising:

receiving in a library management system on an intermediary device a media file containing a speech response recorded on a sender's hand held device in response to the playing of a media prompt file containing one or more audio prompts for information, the library management system comprising the intermediary device between a sender's hand held device and a recipient's hand held device, wherein the intermediary device, the sender's hand held device, and the recipient's hand held device are all distinct devices computer program instructions for converting, by the library management system, the speech response stored in the media file to text; and computer program instructions for storing, by the library management system, the text in association with an identification of the sender.

20. The computer program product of claim 19 wherein computer program instructions for receiving in the library management system the media file containing the speech response recorded on the sender's hand held device in response to the playing of the media prompt file containing one or more audio prompts for information further comprise:

computer program instructions for transmitting to the sender's hand held device the media prompt file containing one or more audio prompts for information;

computer program instructions for playing on the sender's hand held device the media prompt file containing the one or more audio prompts for information;

computer program instructions for recording in another media file on the sender's hand held device the speech response from the sender; and computer program instructions for transmitting the media file containing the speech response to the library management system.

21. The computer program product of claim 20 wherein computer program instructions for transmitting to the sender's hand held device the media prompt file containing one or more audio prompts for information further comprise computer program instructions for synchronizing the sender's hand held device with a local library application coupled for data communications with the library management system.

22. The computer program product of claim 20 wherein computer program instructions for transmitting the media file containing the speech response to a library management system further comprise computer program instructions for synchronizing the sender's hand held device with a local library application coupled for data communications with the library management system.

23. The computer program product of claim 20 wherein computer program instructions for recording in another media file on the sender's hand held device a speech response from the sender further comprise:

computer program instructions for pausing the playback of the media prompt file containing the one or more audio prompts on the sender's hand held device the media prompt file containing the one or more audio prompts for information in response to a sender's instruction to initiate recording in another media file on the sender's hand held device the speech response.

24. The computer program product of claim 23 wherein the sender's instruction to initiate recording in another media file on the sender's hand held device the speech response further comprises a sender's invocation of a push-to-talk button.

25. The computer program product of claim 19, further comprising:
   computer program instructions for obtaining content to be associated with the text;
   computer program instructions for associating said content with the text; and
   computer program instructions for extracting an explicit identification of the content from the text.

26. The computer program product of claim 19, further comprising:
   computer program instructions for transmitting, from the library management system to the sender's hand held device, the media prompt file containing one or more audio prompts for information, wherein the one or more audio prompts were previously uploaded to the library management system for storage.

27. The computer program product of claim 19, further comprising:
   computer program instructions for pausing the media prompt file one or more times;
   computer program instructions for recording in another media file on the sender's hand held device a speech response from the sender while the media prompt file is paused said one or more times;
   computer program instructions for transmitting the media file containing the speech response to the library management system;
   computer program instructions for providing the text to from the intermediary device of the library management system to the recipient's hand held device.

* * * * *